United States Patent
Maeda et al.

(10) Patent No.: US 11,626,786 B2
(45) Date of Patent: Apr. 11, 2023

(54) VIBRATION GENERATOR WITH ELASTIC MEMBER WITH EXTENDING REGIONS AND BENDING METAL PLATE TO SUPPORT THE VIBRATOR

(71) Applicant: ALPS ALPINE CO., LTD., Tokyo (JP)

(72) Inventors: Masanobu Maeda, Miyagi (JP); Katsutoshi Suzuki, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 204 days.

(21) Appl. No.: 16/864,506

(22) Filed: May 1, 2020

(65) Prior Publication Data
US 2020/0366177 A1    Nov. 19, 2020

(30) Foreign Application Priority Data

May 13, 2019 (JP) .............................. JP2019-090497
Nov. 28, 2019 (JP) .............................. JP2019-215233

(51) Int. Cl.
*H02K 33/02* (2006.01)
*H02K 35/02* (2006.01)

(52) U.S. Cl.
CPC ............. *H02K 33/02* (2013.01); *H02K 35/02* (2013.01)

(58) Field of Classification Search
CPC ........ H02K 33/02; H02K 33/16; H02K 35/02; H02K 7/1869; H02K 7/1876; H02K 7/1892; H02K 33/00; B06B 1/045
USPC ........ 310/25, 29, 15, 12.01, 81, 80, 321, 20, 310/21, 28–30, 36–37, 40 MM
See application file for complete search history.

(56) References Cited

U.S. PATENT DOCUMENTS

| | | | | |
|---|---|---|---|---|
| 5,231,337 A * | 7/1993 | van Namen | ........... | H02K 33/18 318/128 |
| 6,323,568 B1 * | 11/2001 | Zabar | ..................... | H02K 33/04 310/12.24 |
| 7,061,146 B2 * | 6/2006 | Hirt | ......................... | F16H 61/28 310/43 |
| 7,671,493 B2 * | 3/2010 | Takashima | .............. | G06F 3/016 310/15 |
| 7,755,227 B2 * | 7/2010 | Hirashima | ............. | H02K 33/16 310/36 |
| 7,928,348 B2 * | 4/2011 | Neal | ...................... | H05B 6/108 219/628 |
| 7,999,421 B2 * | 8/2011 | Kim | ...................... | H02K 33/18 310/15 |

(Continued)

FOREIGN PATENT DOCUMENTS

JP    2010-207731    9/2010

*Primary Examiner* — Maged M Almawri
(74) *Attorney, Agent, or Firm* — IPUSA, PLLC

(57) ABSTRACT

A vibration generator includes a housing; a vibrator; an elastic member that connects the housing and the vibrator; and a driver that causes the vibrator to vibrate. The elastic member includes a housing connection portion that is connected to the housing, a vibrator support portion that supports the vibrator, and a spring portion that connects the housing connection portion and the vibrator support portion. The housing connection portion and the vibrator support portion are in the same plane. The spring portion is formed so as to be approximately perpendicular to the housing connection portion and the vibrator support portion.

8 Claims, 16 Drawing Sheets

(56) References Cited

U.S. PATENT DOCUMENTS

| | | | | |
|---|---|---|---|---|
| 8,269,379 B2 * | 9/2012 | Dong | H02K 33/16 | 310/28 |
| 8,278,786 B2 * | 10/2012 | Woo | H02K 33/16 | 310/15 |
| 8,368,268 B2 * | 2/2013 | Hasegawa | G02B 21/248 | 359/381 |
| 8,492,938 B2 * | 7/2013 | Park | H02K 33/18 | 310/25 |
| 8,643,229 B2 * | 2/2014 | Park | H02K 33/16 | 310/15 |
| 8,648,502 B2 * | 2/2014 | Park | H02K 33/16 | 310/15 |
| 8,803,378 B2 * | 8/2014 | Sonohara | H02K 9/193 | 310/58 |
| 8,829,741 B2 * | 9/2014 | Park | B06B 1/045 | 310/25 |
| 8,878,401 B2 * | 11/2014 | Lee | H02K 33/16 | 310/15 |
| 8,941,272 B2 * | 1/2015 | Hong | H02K 33/18 | 310/15 |
| 9,024,489 B2 * | 5/2015 | Akanuma | H02K 33/16 | 310/15 |
| 9,143,021 B2 * | 9/2015 | Haruno | H02K 11/25 | |
| 9,225,265 B2 * | 12/2015 | Oh | H02N 2/001 | |
| 9,306,429 B2 * | 4/2016 | Akanuma | H02K 33/16 | |
| 9,543,816 B2 * | 1/2017 | Nakamura | H02K 33/16 | |
| 9,748,827 B2 * | 8/2017 | Dong | H02K 33/16 | |
| 9,847,690 B2 * | 12/2017 | Park | H02K 1/28 | |
| 9,906,109 B2 * | 2/2018 | Endo | H02K 33/16 | |
| 9,935,525 B2 * | 4/2018 | Koiwai | H02K 11/25 | |
| 9,948,170 B2 * | 4/2018 | Jun | H02K 33/00 | |
| 10,008,894 B2 * | 6/2018 | Mao | H02K 1/34 | |
| 10,033,257 B2 * | 7/2018 | Zhang | H02K 33/12 | |
| 10,063,128 B2 * | 8/2018 | Wang | H02K 33/16 | |
| 10,160,010 B2 * | 12/2018 | Chun | H02K 33/16 | |
| 10,236,761 B2 * | 3/2019 | Wang | H02K 33/16 | |
| 10,307,791 B2 * | 6/2019 | Xu | B06B 1/045 | |
| 10,328,461 B2 * | 6/2019 | Xu | B06B 1/045 | |
| 10,439,475 B2 * | 10/2019 | Madsen Obel | H02K 5/18 | |
| 10,447,133 B2 * | 10/2019 | Jin | H02K 33/18 | |
| 10,468,920 B2 * | 11/2019 | Sung | H02K 15/02 | |
| 10,483,451 B2 * | 11/2019 | Wang | H01L 41/04 | |
| 10,486,196 B2 * | 11/2019 | Chai | B06B 1/045 | |
| 10,491,090 B2 * | 11/2019 | Zu | H02K 33/16 | |
| 10,547,233 B2 * | 1/2020 | Jin | H02K 5/04 | |
| 10,596,594 B2 * | 3/2020 | Ling | H02K 33/02 | |
| 10,596,596 B2 * | 3/2020 | Ling | B06B 1/045 | |
| 10,674,278 B2 * | 6/2020 | Zhou | H04R 9/025 | |
| 10,763,732 B2 * | 9/2020 | Liu | H02K 33/18 | |
| 10,847,296 B2 * | 11/2020 | Wauke | H01F 7/081 | |
| 10,848,016 B2 * | 11/2020 | Shiohara | H02K 1/146 | |
| 10,886,827 B2 * | 1/2021 | Liu | H02K 33/14 | |
| 11,050,334 B2 * | 6/2021 | Mori | H02K 33/18 | |
| 11,205,937 B2 * | 12/2021 | Song | H02K 5/24 | |
| 11,309,808 B1 * | 4/2022 | Li | H02K 35/02 | |
| 2006/0066164 A1 * | 3/2006 | Kim | H02K 7/063 | 310/81 |
| 2006/0133218 A1 * | 6/2006 | Matthey | B06B 1/045 | 368/230 |
| 2007/0216235 A1 * | 9/2007 | Lee | H02K 33/16 | 310/15 |
| 2007/0278869 A1 * | 12/2007 | Taketsuna | H02K 3/24 | 310/54 |
| 2009/0096299 A1 * | 4/2009 | Ota | B06B 1/045 | 310/25 |
| 2009/0267423 A1 * | 10/2009 | Kajiwara | H02K 33/02 | 310/38 |
| 2010/0045125 A1 * | 2/2010 | Takenaka | H02K 1/20 | 310/54 |
| 2010/0213773 A1 * | 8/2010 | Dong | H02K 33/16 | 310/25 |
| 2010/0302752 A1 * | 12/2010 | An | H02K 33/06 | 361/807 |
| 2011/0018364 A1 * | 1/2011 | Kim | H02K 33/18 | 310/20 |
| 2011/0068640 A1 * | 3/2011 | Choi | H02K 5/04 | 310/25 |
| 2011/0089772 A1 * | 4/2011 | Dong | H02K 33/16 | 310/25 |
| 2011/0115311 A1 * | 5/2011 | Dong | H02K 33/16 | 310/28 |
| 2011/0133577 A1 * | 6/2011 | Lee | H02K 33/18 | 310/15 |
| 2011/0156500 A1 * | 6/2011 | Dong | H02K 33/16 | 310/25 |
| 2011/0266892 A1 * | 11/2011 | Wauke | H02K 33/18 | 310/25 |
| 2011/0316361 A1 * | 12/2011 | Park | H02K 33/16 | 310/25 |
| 2012/0126646 A1 * | 5/2012 | Nakagawa | H02K 5/225 | 310/71 |
| 2012/0153748 A1 * | 6/2012 | Wauke | H02K 33/16 | 310/25 |
| 2012/0169148 A1 * | 7/2012 | Kim | H02K 33/16 | 310/25 |
| 2012/0187780 A1 * | 7/2012 | Bang | H02K 33/16 | 310/25 |
| 2012/0223601 A1 * | 9/2012 | Akuta | H01R 9/22 | 310/58 |
| 2012/0242178 A1 * | 9/2012 | Miyamoto | H02K 9/19 | 310/54 |
| 2012/0313459 A1 * | 12/2012 | Zhang | H02K 33/18 | 310/25 |
| 2013/0061736 A1 * | 3/2013 | Wauke | G10H 1/42 | 84/736 |
| 2013/0099600 A1 * | 4/2013 | Park | B06B 1/045 | 310/15 |
| 2013/0099602 A1 * | 4/2013 | Park | H02K 33/16 | 310/25 |
| 2014/0035397 A1 * | 2/2014 | Endo | H02K 33/18 | 310/30 |
| 2014/0070667 A1 * | 3/2014 | Oh | B06B 1/0644 | 310/329 |
| 2014/0152148 A1 * | 6/2014 | Oh | B06B 1/0648 | 310/321 |
| 2014/0217858 A1 * | 8/2014 | Haruno | H02K 5/225 | 310/68 C |
| 2014/0346924 A1 * | 11/2014 | Son | H10N 30/2041 | 310/317 |
| 2015/0123498 A1 * | 5/2015 | Yang | H02K 33/16 | 310/25 |
| 2015/0137627 A1 * | 5/2015 | Katada | H02K 33/16 | 310/25 |
| 2015/0137628 A1 * | 5/2015 | Endo | H02K 33/16 | 310/25 |
| 2015/0194870 A1 * | 7/2015 | Kim | H02K 33/18 | 310/25 |
| 2016/0164389 A1 * | 6/2016 | Jang | H02K 7/116 | 310/20 |
| 2016/0173990 A1 * | 6/2016 | Park | H04R 9/043 | 381/354 |
| 2016/0218607 A1 * | 7/2016 | Oh | B06B 1/045 | |
| 2017/0019011 A1 * | 1/2017 | Wang | H02K 33/16 | |
| 2017/0033653 A1 * | 2/2017 | Wang | H02K 33/16 | |
| 2017/0033657 A1 * | 2/2017 | Mao | H02K 33/16 | |
| 2017/0033669 A1 * | 2/2017 | Xu | H02K 33/16 | |
| 2017/0104401 A1 * | 4/2017 | Umehara | H02K 33/06 | |
| 2017/0110920 A1 * | 4/2017 | Mao | H02K 1/34 | |
| 2017/0214306 A1 * | 7/2017 | Katada | H02K 33/16 | |
| 2017/0288519 A1 * | 10/2017 | Kim | H02K 33/00 | |
| 2018/0021812 A1 * | 1/2018 | Akanuma | H02K 33/00 | 310/25 |
| 2018/0026493 A1 * | 1/2018 | Jung | H02K 9/00 | 310/52 |
| 2018/0241295 A1 * | 8/2018 | Zu | H02K 33/14 | |
| 2018/0250107 A1 * | 9/2018 | Dai | A61C 17/221 | |
| 2018/0288907 A1 * | 10/2018 | Richards | H01L 23/473 | |
| 2019/0044425 A1 * | 2/2019 | Zu | H02K 33/02 | |

(56) References Cited

U.S. PATENT DOCUMENTS

| | | | | |
|---|---|---|---|---|
| 2019/0151895 A1* | 5/2019 | Takahashi | ............. | H02K 33/18 |
| 2019/0206601 A1* | 7/2019 | Wauke | ................ | H01F 7/0289 |
| 2021/0194342 A1* | 6/2021 | Kitahara | ................ | B06B 1/045 |

* cited by examiner

VIBRATION GENERATOR WITH ELASTIC MEMBER WITH EXTENDING REGIONS AND BENDING METAL PLATE TO SUPPORT THE VIBRATOR

CROSS-REFERENCE TO RELATED APPLICATIONS

This application is based on and claims priority to Japanese Patent Application No. 2019-090497, filed on May 13, 2019, and Japanese Patent Application No. 2019-215233, filed on Nov. 28, 2019, the entire contents of which are incorporated herein by reference.

BACKGROUND OF THE INVENTION

1. Field of the Invention

The disclosures herein generally relate to a vibration generator.

2. Description of the Related Art

Some mobile electronic equipment, such as mobile phones and game consoles, are equipped with vibration generators that generate vibrations for notifying users of incoming calls or providing users with tactile feel in accordance with the game situations. As such vibration generators, a vibration generator that includes a magnet and causes the magnet to vibrate is disclosed (Patent Document 1, for example). In the vibration generator disclosed in Patent Document 1, the magnet is disposed on a plate spring that is formed by bending a metal plate in different directions.

In the above-described vibration generator, because the plate spring is formed by bending a metal plate a plurality of times in different directions, a plurality of molds and a plurality of pressing process are required, thus making it difficult to manufacture the vibration generator.

RELATED-ART DOCUMENTS

Patent Documents

[Patent Document 1] Japanese Laid-Open Patent Publication No. 2010-207731

SUMMARY OF THE INVENTION

It is a general object of the present invention to provide a vibration generator that can be readily manufactured.

According to one embodiment of the present invention, a vibration generator includes a housing; a vibrator; an elastic member that connects the housing and the vibrator; and a driver that causes the vibrator to vibrate. The elastic member includes a housing connection portion that is connected to the housing, a vibrator support portion that supports the vibrator, and a spring portion that connects the housing connection portion and the vibrator support portion. The housing connection portion and the vibrator support portion are in the same plane. The spring portion is formed so as to be approximately perpendicular to the housing connection portion and the vibrator support portion.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
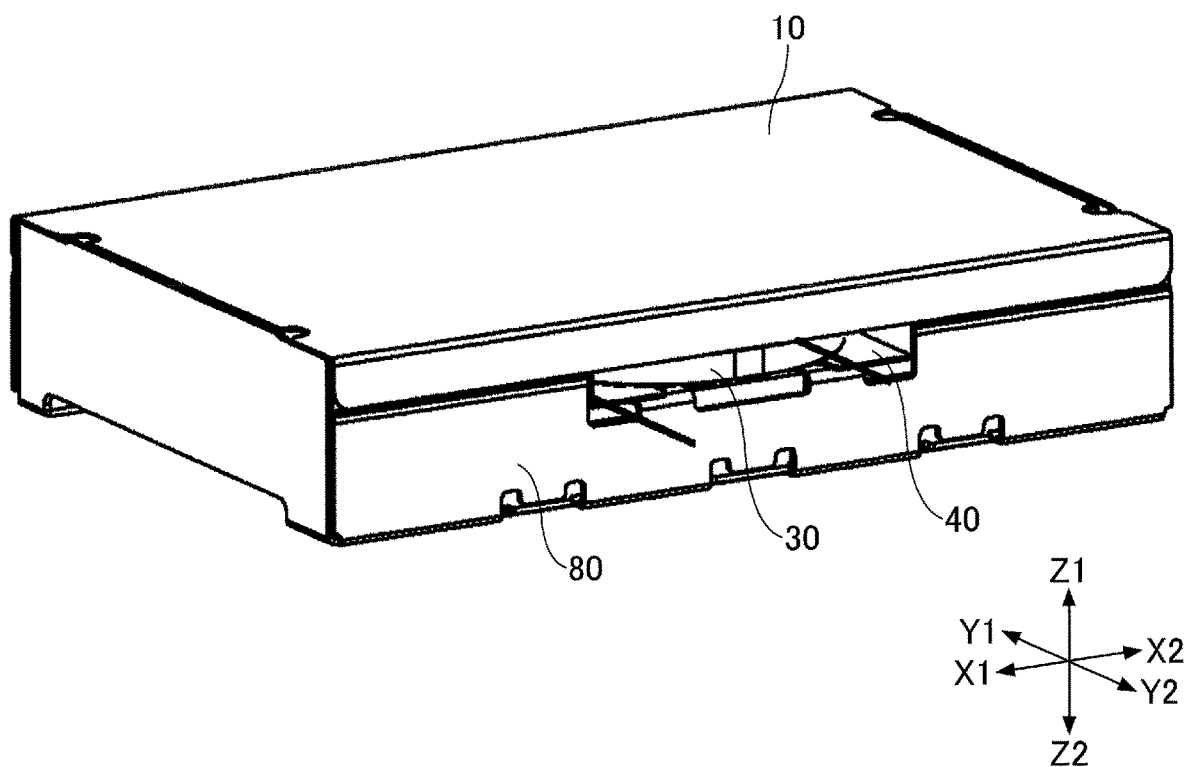
FIG. 1 is a perspective view of a vibration generator according to a first embodiment.

According to one embodiment of the present invention, it is possible to provide a vibration generator that can be readily manufactured without requiring a plurality of molds and a plurality of pressing processes.

In the following, embodiments will be described. The same members are denoted by the same reference numerals, and a description thereof will not be repeated. Further, in the present application, an X1-X2 direction, a Y1-Y2 direction, and a Z1-Z2 direction are mutually perpendicular directions. Further, a plane including the X1-X2 direction and the Y1-Y2 direction is referred to as a XY-plane, a plane including the Y1-Y2 direction and the Z1-Z2 direction is referred to as a YZ-plane, and a plane including the Z1-Z2 direction and the X1-X2 direction is referred to as a ZX-plane.

First Embodiment

Figure 2:
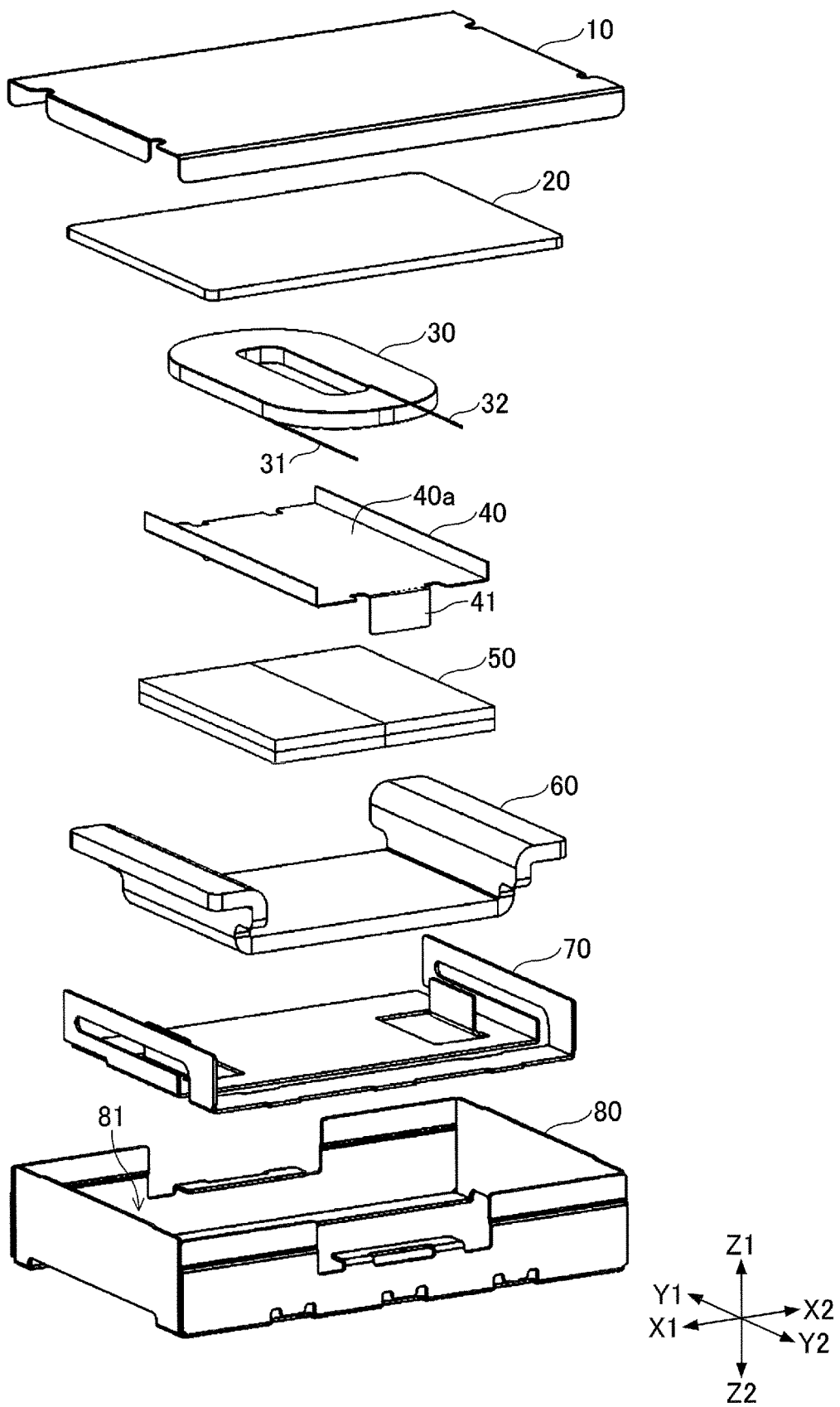
FIG. 2 is an exploded perspective view of the vibration generator according to the first embodiment.

A vibration generator according to a first embodiment will be described with reference to FIG. 1 and FIG. 2. FIG. 1 is a perspective view of the vibration generator according to the first embodiment. FIG. 2 is an exploded perspective view of the vibration generator according to the first embodiment. The vibration generator according to the first embodiment includes a cover 10, an upper yoke 20, a coil 30, a bracket 40, a magnet 50, a lower yoke 60, an elastic member 70, and a housing 80. Note that, in the present embodiment, the cover 10, the bracket 40, the elastic member 70, and the housing 80 are formed of non-magnetic stainless steel. The upper yoke 20 and the lower yoke 60 are formed of a magnetic material including Fe and the like.

As illustrated in FIG. 1, the vibration generator according to the present embodiment has an approximately rectangular parallelepiped shape whose largest surface is parallel to the XY-plane. The vibration generator is formed such that the length in the X1-X2 direction (longitudinal direction) of the largest surface is 15 mm, the width in the Y1-Y2 direction (lateral direction) is 10 mm, and the height in the Z1-Z2 direction (height direction) is 3 mm.

Figure 3:
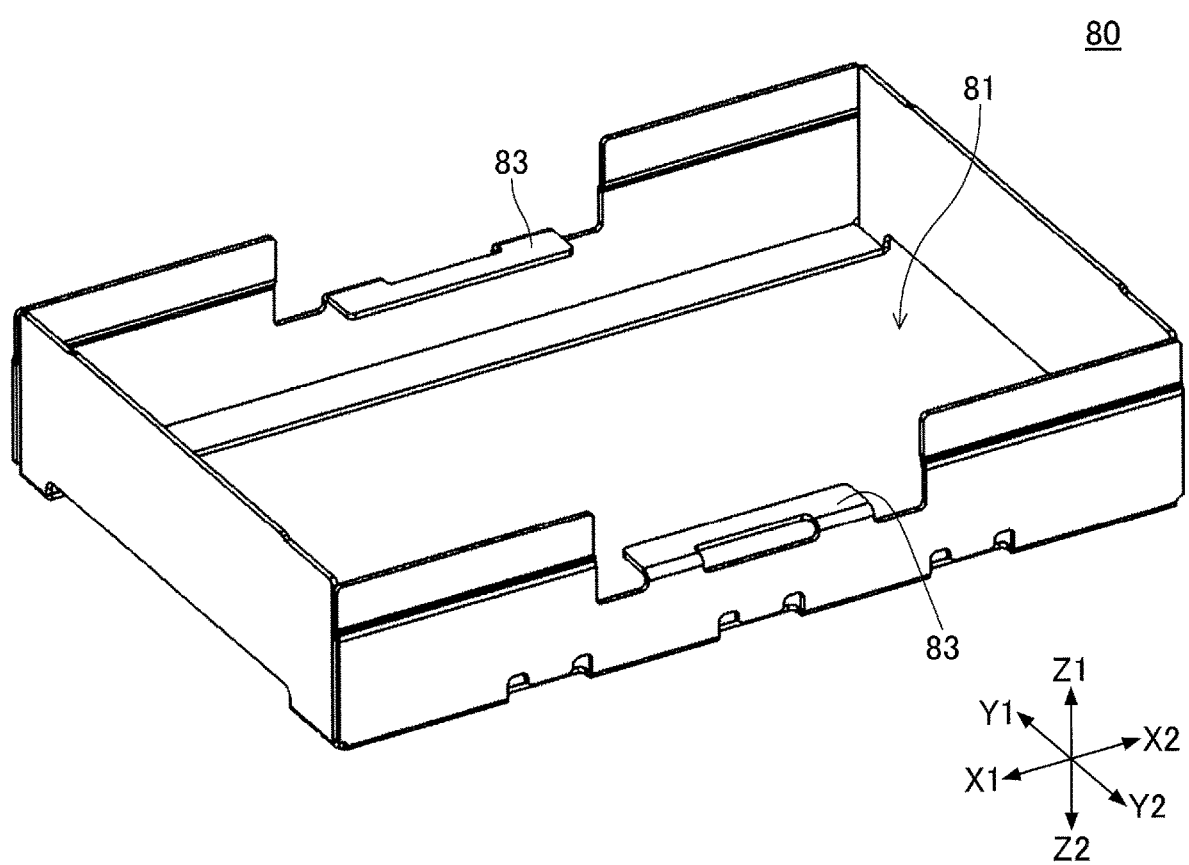
FIG. 3 is a perspective view of a housing of the vibration generator according to the first embodiment.
Figure 4:
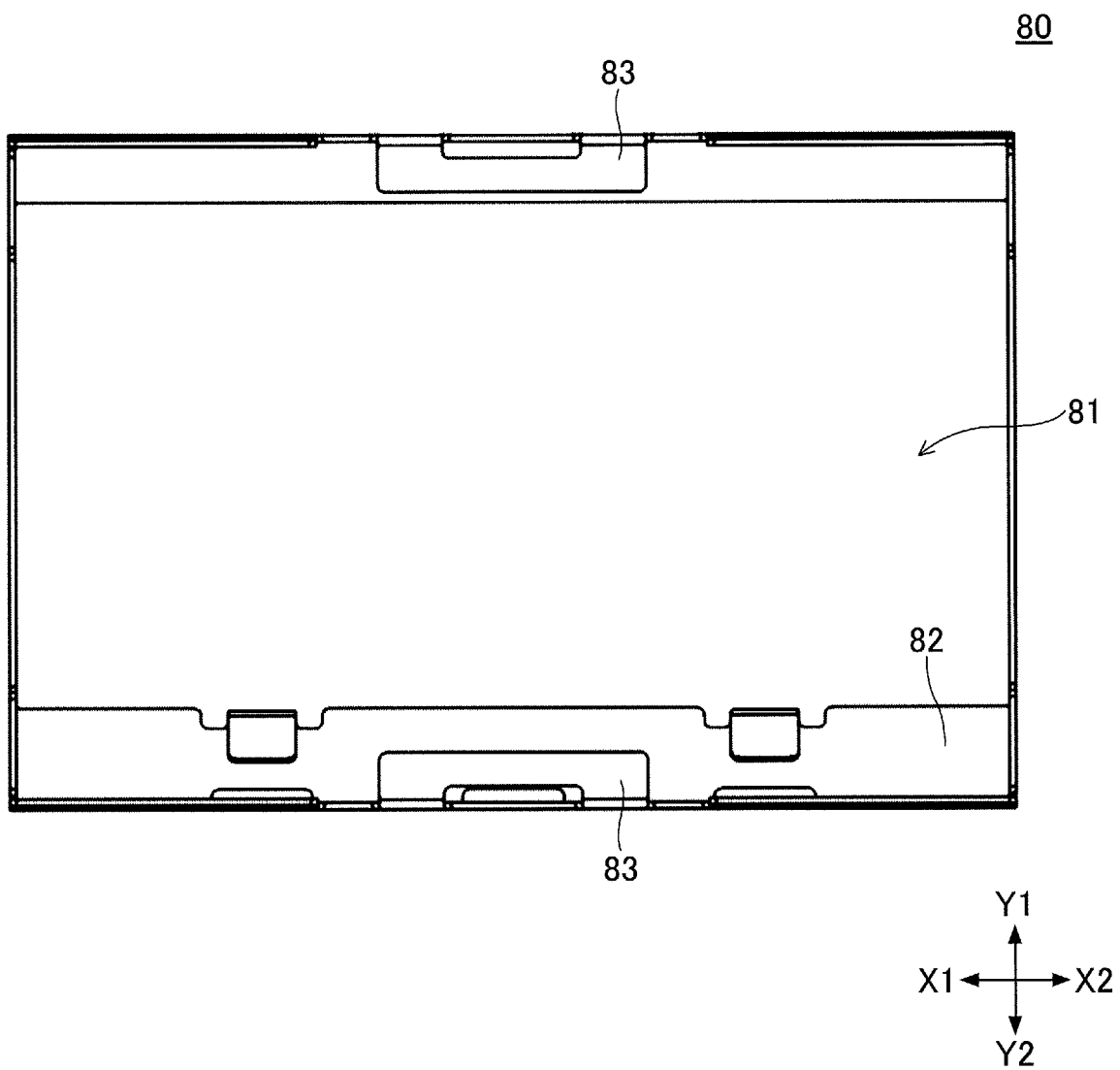
FIG. 4 is a top view of the housing of the vibration generator according to the first embodiment.

A casing of the vibration generator according to the present embodiment is configured by the housing 80 and the cover 10. As illustrated in FIG. 3 and FIG. 4, the housing 80 has an approximately rectangular frame shape, and has an opening 81 through the Z1-Z2 direction. Further, a bottom plate portion 82 parallel to the XY-plane is formed on the Y2 (Z2) side of the opening 81. Further, bracket support portions 83 are provided at the middle of the Y1 side and Y2 side of the housing 80.

The housing 80 accommodates the elastic member 70, the lower yoke 60, the magnet 50, the bracket 40, the coil 30, and the upper yoke 20, and the cover 10 is placed from the Z1 side (the upper side). Further, in the present application, the casing configured by the housing 80 or by the cover 10 and the housing 80 may be referred to as a case.

Figure 5:
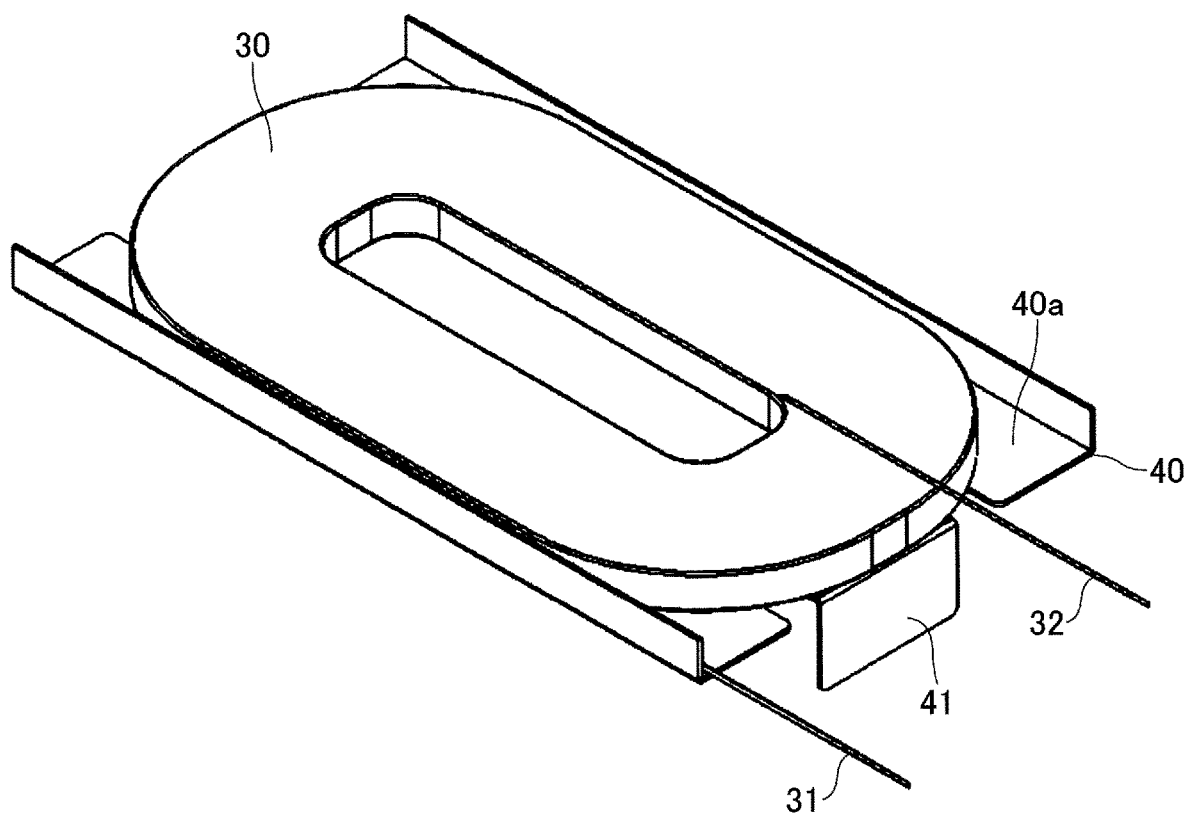
FIG. 5 is a perspective view of a coil and a bracket according to the first embodiment.
Figure 5:
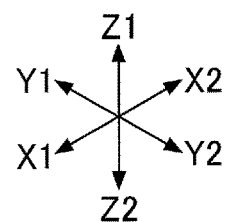

As illustrated in FIG. 5, the coil 30 is wound such that the coil 30 extends in the Y1-Y2 direction, and includes terminals 31 and 32 between which a current flows. The coil 30 is disposed on a surface 40a on the Z1 side of the bracket 40, and is fixed to the bracket 40. Further, housing attachment portions 41 for connection to the housing 80 are formed on the Y1 side and Y2 side of the bracket 40, so as to extend in the Z2 direction. Note that the bracket 40 is formed by punching and bending a metal plate such as non-Magnetic stainless steel.

Figure 6:
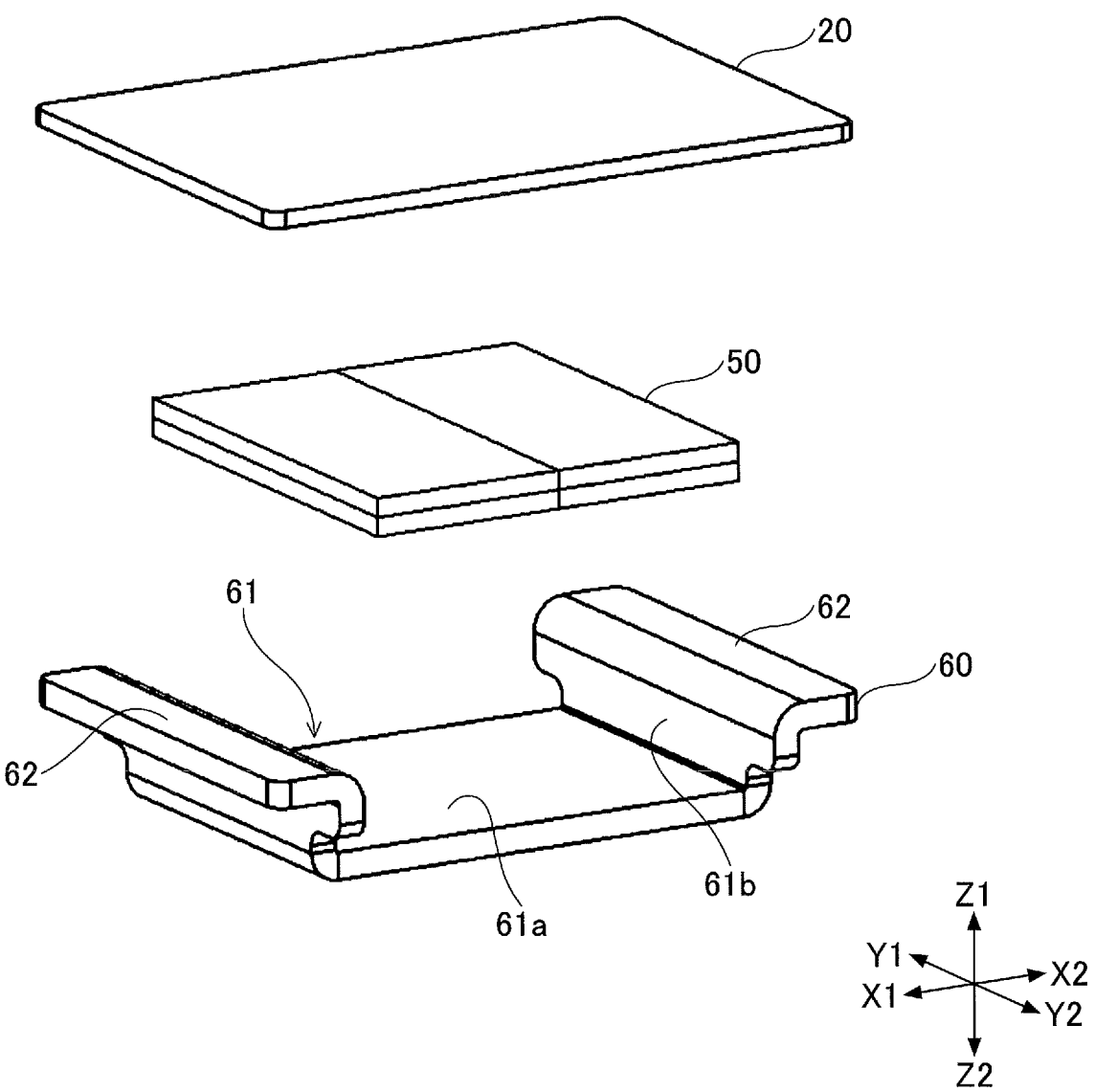
FIG. 6 is an exploded perspective view of a vibrator of the vibration generator according to the first embodiment.

As illustrated in FIG. 6, the upper yoke 20 has a rectangular flat plate shape whose longitudinal direction is the X1-X2 direction and the lateral direction is the Y1-Y2 direction. The lower yoke 60 has a recessed portion 61 whose longitudinal direction is the X1-X2 direction and that is recessed in the Z2 direction. Side surfaces 61b extending from a bottom surface 61a in the Z1 direction are formed on the X1 side and on the X2 side of the recessed portion 61 of the lower yoke 60. Further, connecting portions 62 extend outwardly relative to the side surfaces 61b in the X1 direction and the X2 direction. On the Z1 side of the magnet 50, the X1 side of the magnet 50 is the S-pole and the X2 side is the N-pole. On the Z2 side of the magnet 50, the X1 side of the magnet 50 is the N-pole and the X2 side is the S-pole.

When a vibrator of the vibration generator according to the present embodiment is assembled, the magnet 50 is attached to the bottom surface 61a of the recessed portion 61 of the lower yoke 60. Further, the connecting portions 62 of the lower yoke 60 are joined to the upper yoke 20. In the present embodiment, the lower yoke 60 and the upper yoke 20, located in the surroundings of the magnet 50, are separate members, thus allowing the vibrator to be readily assembled.

Figure 7:
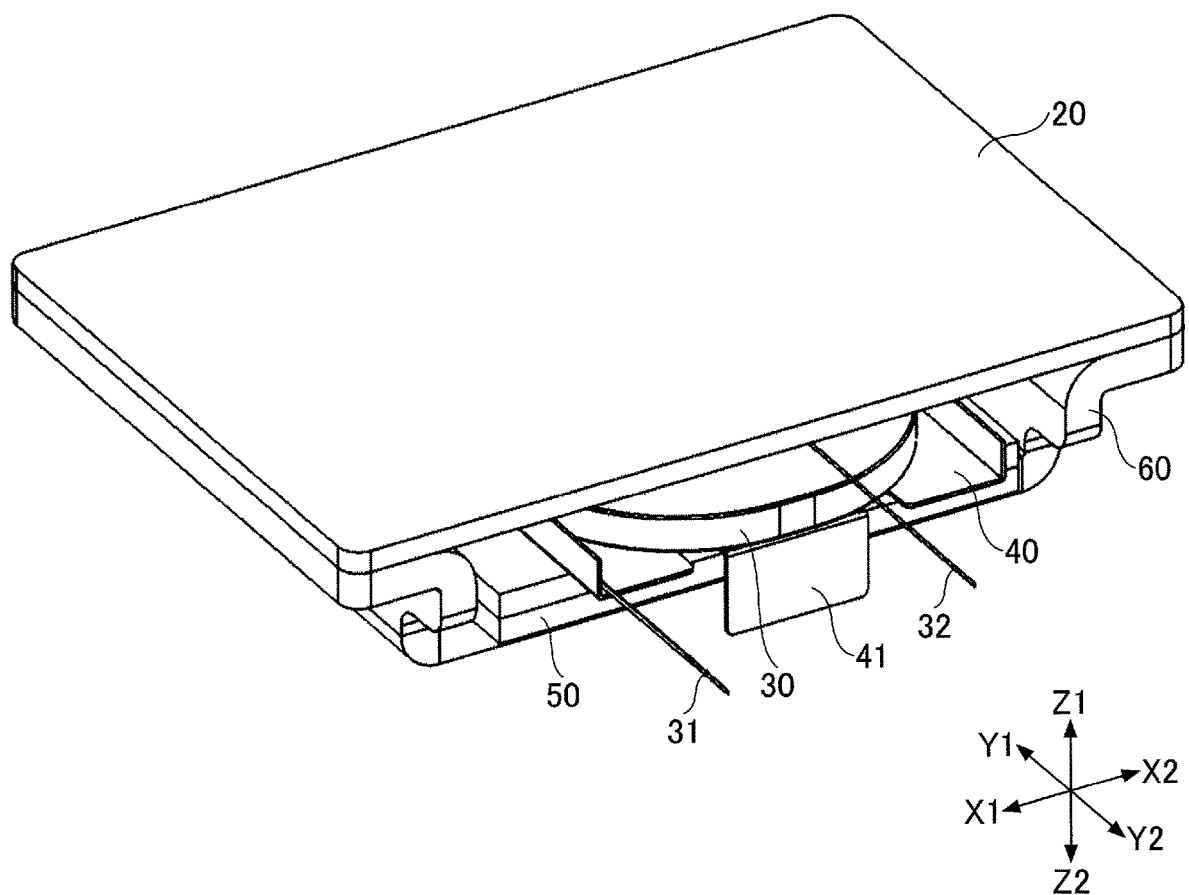
FIG. 7 is a perspective view of a coil, a bracket, and the vibrator of the vibration generator according to the first embodiment.
Figure 8:
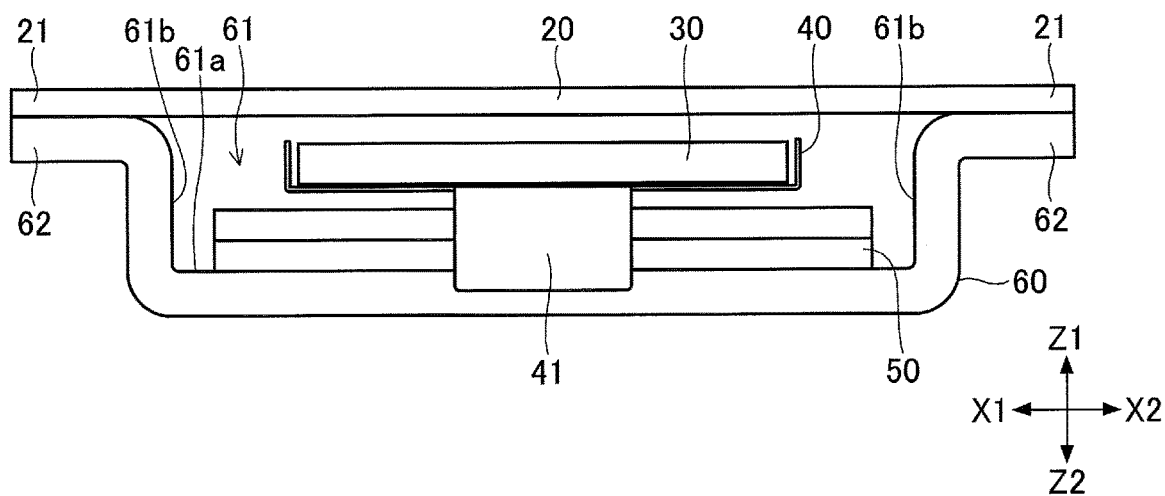
FIG. 8 is a front view of the coil, the bracket, and the vibrator of the vibration generator according to the first embodiment.

As illustrated in FIG. 7 and FIG. 8, the surface on the Z2 side of the magnet 50 is joined to the bottom surface 61a of the recessed portion 61 of the lower yoke 60, and the surfaces on the Z1 side of the connecting portions 62, which are located on the X1 side and the X2 side of the lower yoke 60, are joined to connecting portions 21 of the upper yoke 20. Further, the coil 30, which is fixed to the bracket 40, is provided on the Z1 side relative to the magnet 50, within a region defined by the recessed portion 61 between the lower yoke 60 and the upper yoke 20.

The bracket 40 is attached to the housing 80 by inserting the housing attachment portions 41 of the bracket 40 into openings of the bracket support portions 83 of the housing 80. Accordingly, the vibrator is formed by the upper yoke 20, the magnet 50, and the lower yoke 60. However, the vibrator is not connected to either the bracket 40 or the coil 30.

Figure 9:
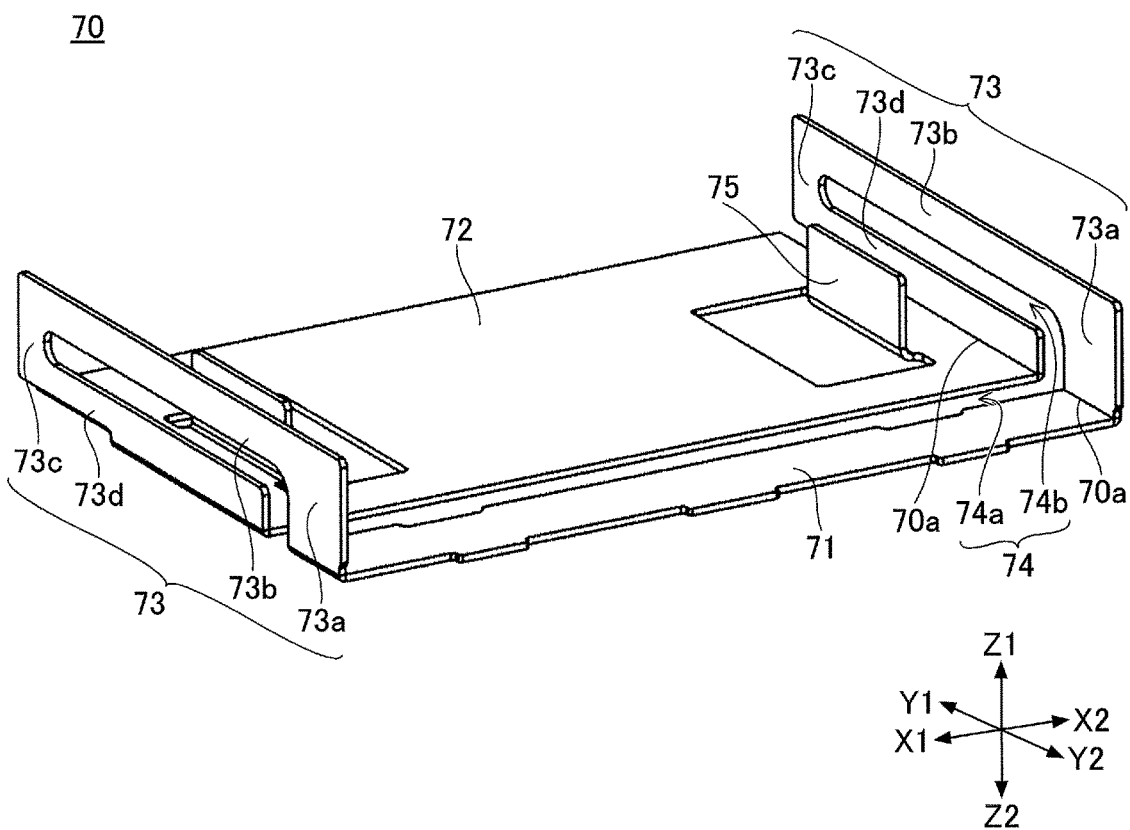
FIG. 9 is a perspective view of an elastic member of the vibration generator according to the first embodiment.

As illustrated in FIG. 9, the elastic member 70 includes a housing connection portion 71, a vibrator support portion 72, and spring portions 73. The housing connection portion 71 is fixed to the housing 80 by connecting the surface on the Z2 side of the housing connection portion 71 to the surface on the Z1 side of the bottom plate portion 82 of the housing 80. Further, the Z2 side of the vibrator, formed by the upper yoke 20, the magnet 50, and the lower yoke 60, is joined and fixed to the Z1 side of the vibrator support portion 72. The spring portions 73 are provided between the housing connection portion 71 and the vibrator support portion 72.

Figure 10:
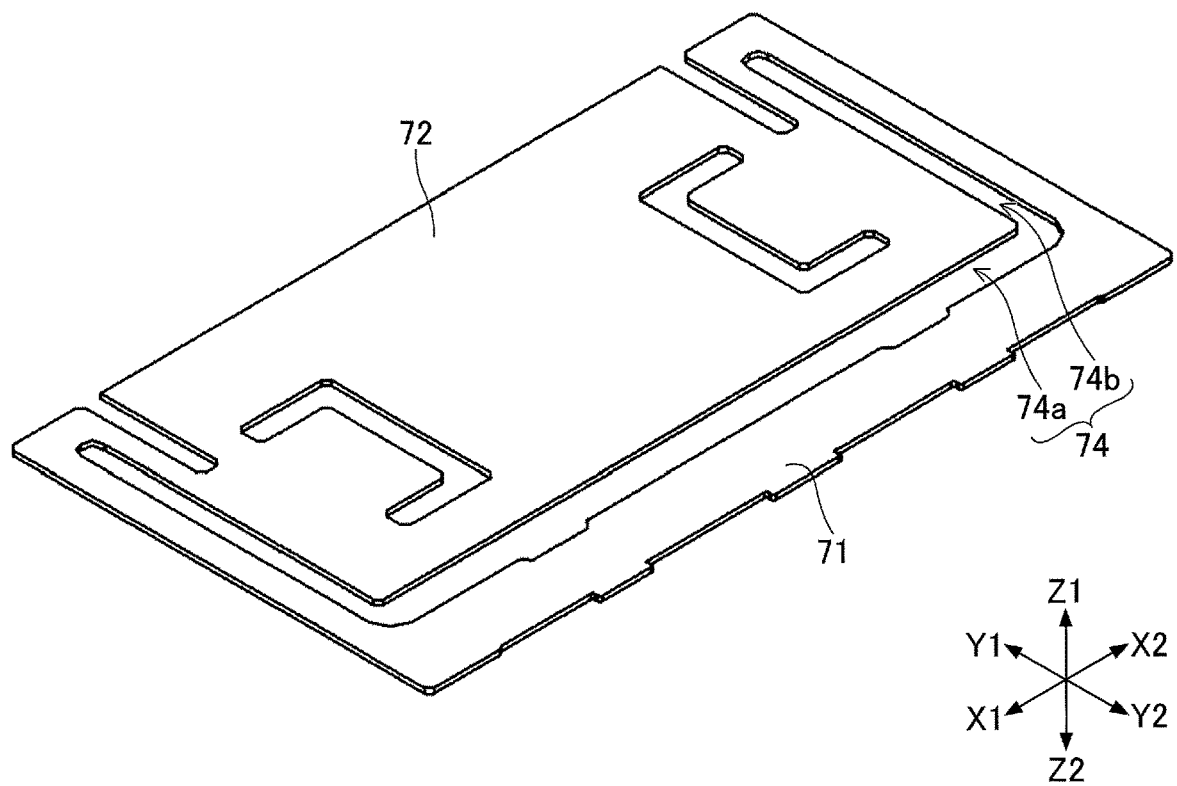
FIG. 10 is a diagram that depicts an elastic member of the vibration generator according to the first embodiment.

The elastic member 70 is formed as follows. First, a metal plate such as non-magnetic stainless steel having a thickness of 0.1 mm is punched to obtain a punched metal plate as illustrated in FIG. 10. Next, the elastic member 70 as illustrated in FIG. 9 is formed by bending the punched metal plate. The spring portions 73 are formed by bending both ends on the X1 side and the X2 side of the punched metal plate illustrated in FIG. 10 approximately perpendicularly with respect to bend lines 70a (the bend lines 70a are illustrated in FIG. 9), which are parallel to the Y1-Y2 direction. In the elastic member 70, the housing connection portion 71 and the vibrator support portion 72 are in the same plane.

The metal plate forming the elastic member 70 has a groove 74, which is formed by punching the metal plate. The housing connection portion 71 and the vibrator support portion 72 are separated by a first groove 74a of the groove 74. The first groove 74a of the groove 74 extends in the X1-X2 direction, and is perpendicular to the Y1-Y2 direction in which the bend lines 70a extend. Accordingly, the housing connection portion 71 is formed on the Y2 side of the first groove 74a of the groove 74, and the vibrator support portion 72 is formed on the Y1 side of the first groove 74a of the groove 74.

Further, the spring portions 73 are formed approximately in parallel to the YZ-plane. The groove 74 includes a second groove 74b that extends in the Y1-Y2 direction, and the second groove 74b is formed in each of the spring portions 73, thus allowing the spring portions 73 to have desired elasticity. The spring portions 73 each include a first region 73a connected to the housing connection portion 71 and extending from the housing connection portion 71 in the Z1 direction; a second region 73b extending from the first region 73a in the Y1 direction; a third region 73c extending from the second region 73b in the Z2 direction; and a fourth region 73d connecting the third region 73c to the vibrator support portion 72 and extending in the Y1-Y2 direction. The second region 73b and the fourth region 73d are separated by the second groove 74b that extends in the Y1-Y2 direction, and the second region 73b extends in the Y1-Y2 direction and in particular, functions as a spring. Accordingly, the second region 73b of each of the spring portions 73 extends in a direction parallel to the bend lines 70a.

When an elastic member such as a spring is formed by bending a metal plate, it would be difficult to bend the metal plate at an angle of approximately 180° in terms of manufacturing. Further, due to the decreased strength of the bent portion, the metal plate would be readily damaged when vibrated. In view of the above, in the present embodiment, the elastic member 70 is formed by bending a metal plate at approximately 90°, in order to enable easy manufacturing and to prevent a decrease in strength. Accordingly, the vibration generator can be readily manufactured and reliability can also be improved.

Further, the vibrator is joined to the vibrator support portion 72. The vibrator support portion 72 is provided with bent portions 75 that are formed by causing portions on the X1 side and the X2 side of the vibrator support portion 72 to be bent approximately perpendicularly. The bent portions 75 are situated on the X1 side and the X2 side of the vibrator. The bent portions 75 may be used as marks for alignment when the vibrator is attached to the vibrator support portion 72, or may be used as support portions for supporting the X1 side and the X2 side of the vibrator.

Figure 11:
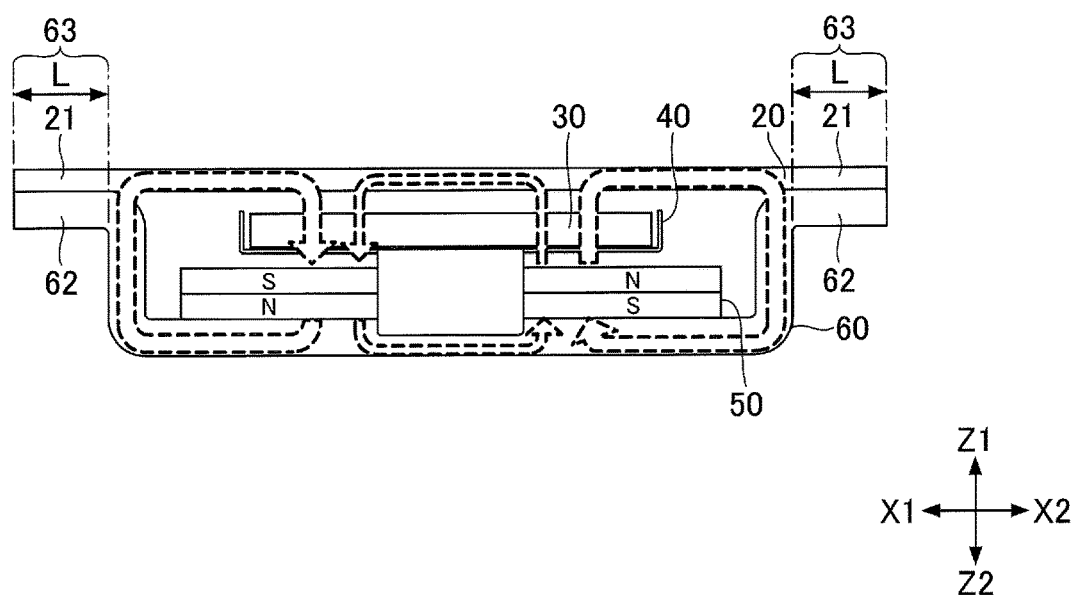
FIG. 11 is a diagram that depicts a magnetic field generated in the vibration generator according to the first embodiment.
Figure 12:
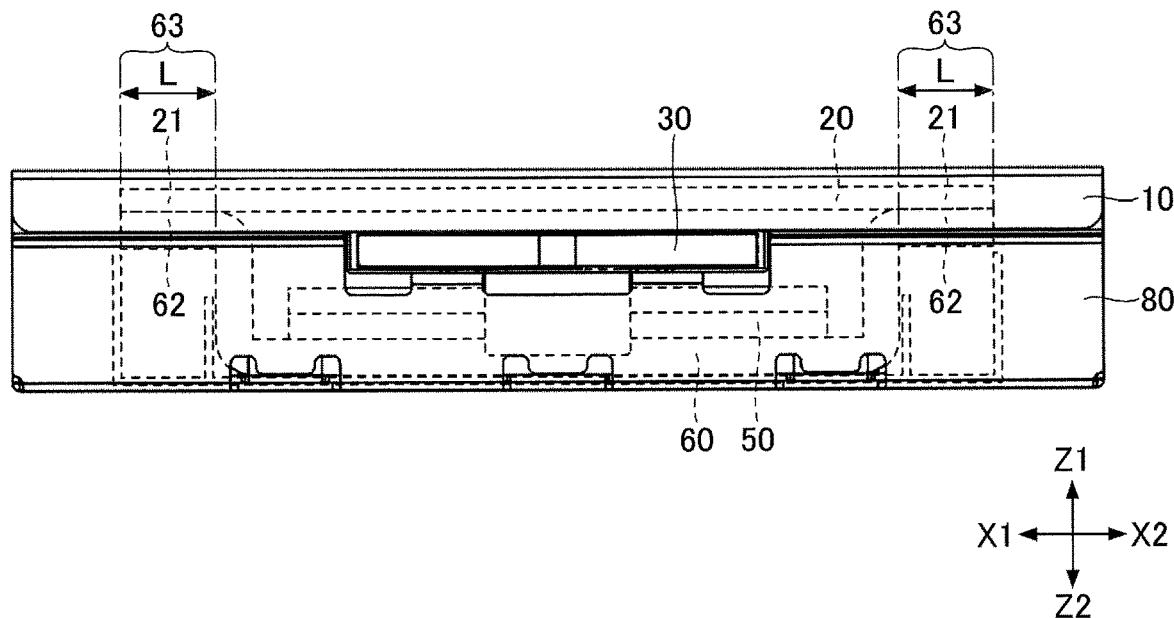
FIG. 12 is a front view of the vibration generator according to the first embodiment.

Next, the generation of a vibration by the vibration generator according to the present embodiment will be described. FIG. 11 depicts the vibrator, formed by the upper yoke 20, the magnet 50, and the lower yoke 60, and also the coil 30 and the bracket 40 provided within a space between the lower yoke 60 and the upper yoke 20, of the vibration generator according to the present embodiment. Dashed arrows in FIG. 11 indicate magnetic lines of force generated by the magnetic field of the magnet 50. FIG. 12 is a front view of the vibration generator according to the present embodiment.

Specifically, on the X1 side of the magnet 50, a magnetic line of force is directed from the N-pole on the Z2 side into the S-pole on the X1 side of the magnet 50, through the inside of the lower yoke 60, the inside of the upper yoke 20, and a space between the upper yoke 20 and the S-pole on the X1 side of the magnet 50. Further, on the X2 side of the magnet 50, a magnetic line of force is directed from the N-pole on the Z1 side into the S-pole on the X2 side of the magnet 50, through a space between the N-pole on the X2 side of the magnet 50 and the upper yoke 20, the inside of the upper yoke 20, and the inside of the lower yoke 60. Further, a magnetic line of force directed from the N-pole into the S-pole is present on the Z1 side of the magnet 50, and a magnetic line of force directed from the N-pole into the S-pole is present on the Z2 side of the magnet 50.

Accordingly, the magnetic lines of force concentrate in the space between the upper yoke 20 and the lower yoke 60, and the magnetic field is thus strong. The coil 30 is provided in this space. In the present embodiment, an alternating current flowing between the terminal 31 and the terminal 32 allows the vibrator, formed by the upper yoke 20, the magnet 50, and the lower yoke 60, to vibrate in the X1-X2 direction.

For example, when a current is applied such that the terminal 31 of the coil 30 becomes positive and the terminal 32 becomes negative, the vibrator, formed by the upper yoke 20, the magnet 50, and the lower yoke 60, moves in the X2 direction. Further, when a current is applied such that the terminal 31 of the coil 30 becomes negative and the terminal 32 becomes positive, the vibrator, formed by the upper yoke 20, the magnet 50, and the lower yoke 60, moves in the X1 direction. Therefore, the vibrator, formed by the upper yoke 20, the magnet 50, and the lower yoke 60, can vibrate in the X1-X2 direction by applying a current such that the terminal 31 and the terminal 32 of the coil 30 become alternately positive and negative. Note that the coil 30 and the bracket 40 do not vibrate because the bracket 40, to which the coil 30 is fixed, is separated from the vibrator.

As the weight of the vibrator increases, the resulting generated vibration is stronger. For this reason, the weight of the vibrator is increased by increasing the length in the X1-X2 direction of each of the connecting portions 21 of the upper yoke 20, to which the connecting portions 62 of the lower yoke 60 are connected. In the present application, the connecting portions 62 of the lower yoke 60 and the connecting portions 21 of the upper yoke 20, to which the connecting portions 62 are connected, may be collectively referred to as "extended regions 63". In the present embodiment, the length L in the X1-X2 direction of each of the extended regions 63 is approximately 1.3 mm, and the weight of the vibrator is increased by the weight of the extended regions 63 formed on both sides. The thickness of the upper yoke 20 is 0.3 mm, and the thickness of the lower yoke 60 is 0.5 mm. Thus, the lower yoke 60 is thicker than the upper yoke 20.

Figure 13:
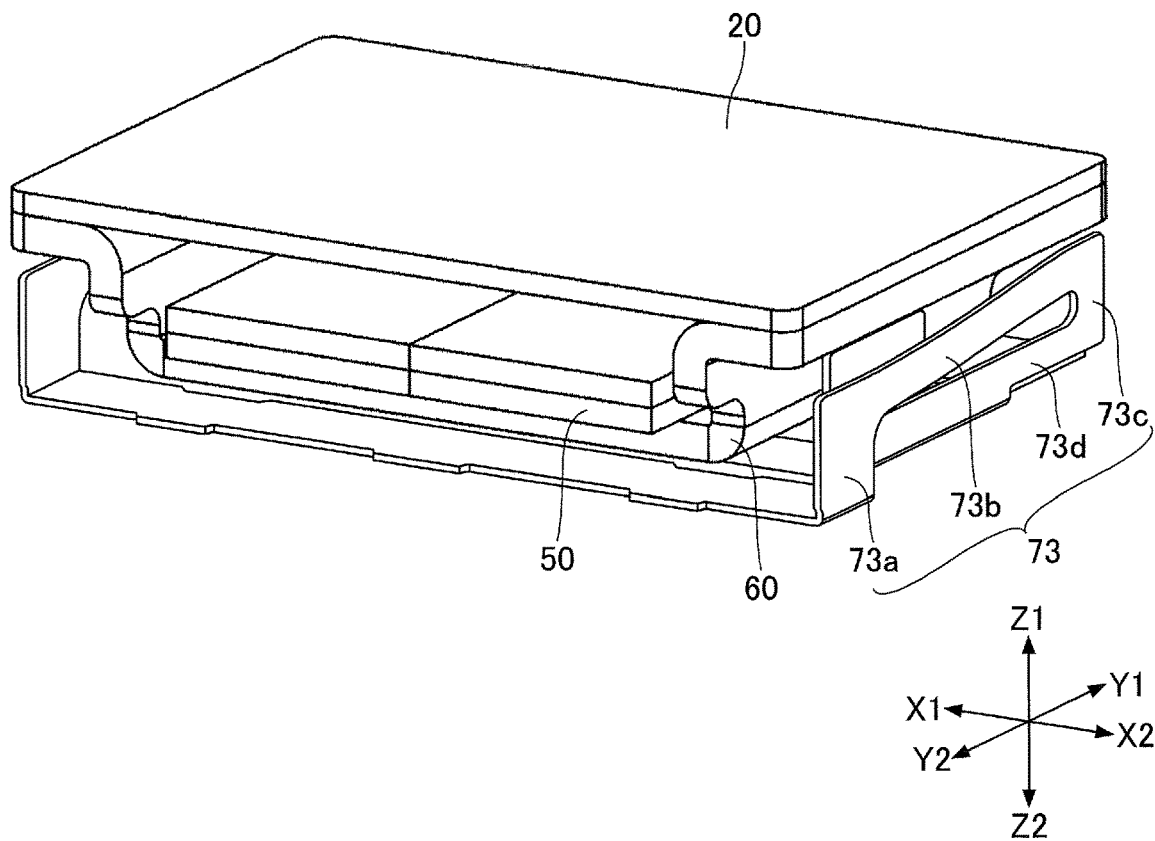
FIG. 13 is a diagram (1) that depicts the vibration generator according to the first embodiment.

In the present embodiment, the weight of the vibrator, formed by the upper yoke 20, the magnet 50, and the lower yoke 60, is 1.03 g. Further, when the vibrator is vibrated at the natural frequency of 99 Hz, a stroke length of ±1.2 mm, that is, the total stroke length of 2.4 mm in the X1-X2 direction can be obtained. As a result, a strong vibration can be obtained. FIG. 13 depicts a state in which the vibrator is displaced after the vibration generator is vibrated. As illustrated in FIG. 13, the second region 73b of each of the spring portions 73 of the elastic member 70 is largely deformed, indicating that the second region 73b serves as a main elastic region and functions as a spring.

The extended regions 63 formed by the upper yoke 20 and the lower yoke 60 preferably extend in the vibration direction, outwardly relative to the recessed portion 61 of the lower yoke 60. In the present embodiment, the X1-X2 direction is the vibration direction. In the Y1-Y2 direction perpendicular to the vibration direction, the bracket 40 supporting the coil 30 is connected to the housing 80. Thus, it would be difficult to form extended regions with sufficient mass in the Y1-Y2 direction. Further, if extended regions are formed in the Z1-Z2 direction, the height of the vibration generator would be increased, thus failing to satisfy downsizing requirements. Accordingly, the extended regions 63 are formed in the X1-X2 direction, which is the vibration direction.

Figure 14:
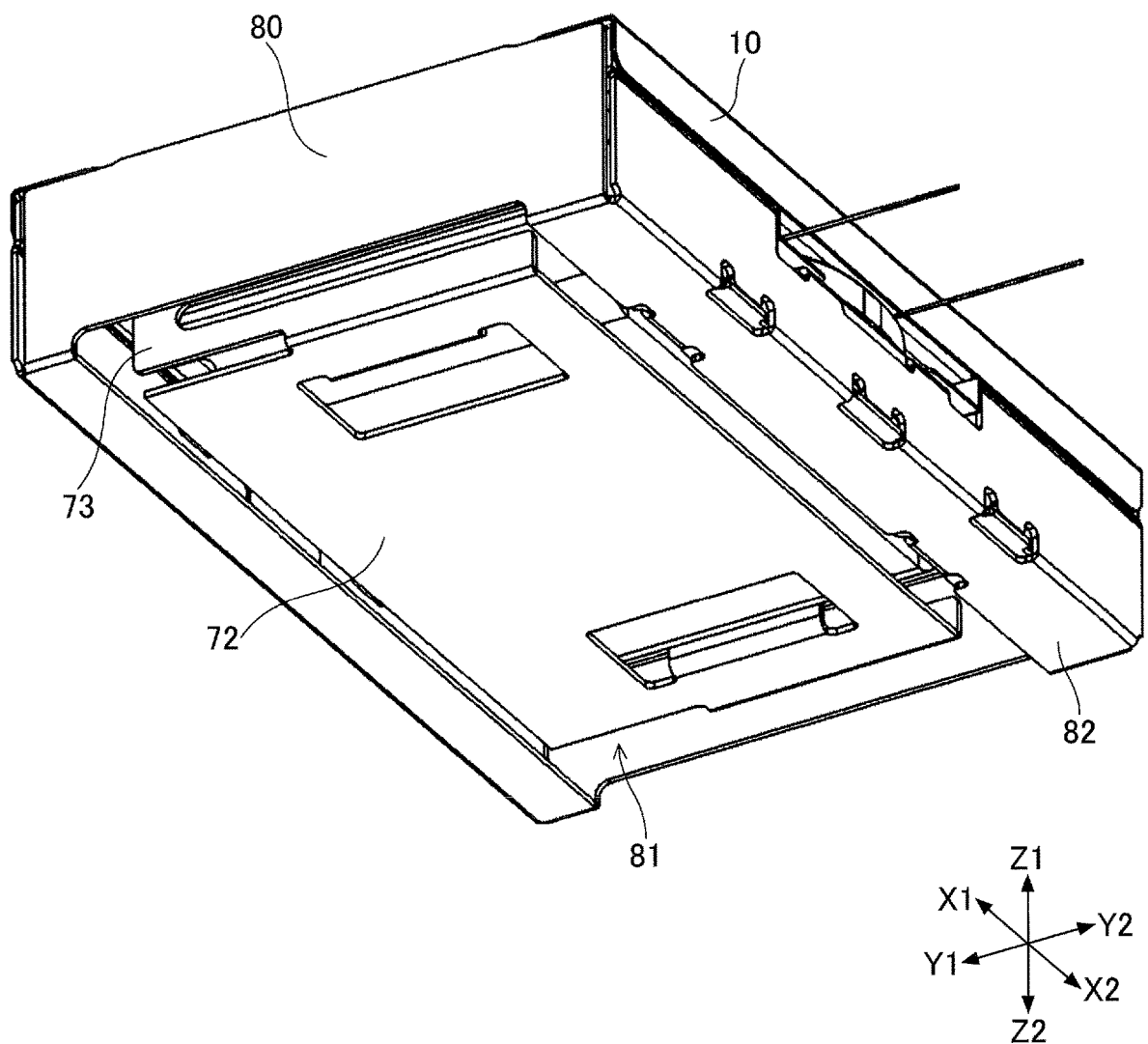
FIG. 14 is a diagram (2) that depicts the vibration generator according to the first embodiment.

As illustrated in FIG. 14, in the vibration generator according to the present embodiment, the housing 80 has the opening 81 in a region corresponding to the vibrator support portion 72 of the elastic member 70. That is, on the Z2 side of the housing 80, the opening 81 is formed in the region corresponding to the vibrator support portion 72 of the elastic member 70. Accordingly, because the housing 80 has the opening 81 in the region corresponding to the vibrator support portion 72 of the elastic member 70, the housing 80 does not contact the vibrator support portion 72 of the elastic member 70, and thus does not hinder the vibration of the vibrator. Specifically, in the present embodiment, the housing connection portion 71 of the elastic member 70 and the vibrator support portion 72 are in the same plane. Therefore, if the housing 80 has a bottom plate portion in the region where the vibrator support portion 72 is situated, the bottom plate portion of the housing 80 would contact the vibrator support portion 72, and friction would be generated when the vibrator is vibrated, thus causing the vibration of the vibrator to be hindered. In the present embodiment, the housing 80 has the opening 81 in the region corresponding to the vibrator support portion 72 of the elastic member 70. Accordingly, the housing 80 does not contact the vibrator support portion 72 of the elastic member 70, and thus, does not affect the vibration of the vibrator.

Further, it may be contemplated that an elastic member may be formed such that a vibrator support portion is situated on the Z2 side relative to a housing connection portion, thereby providing a level difference between the housing connection portion and the vibrator support portion. In this case, even if the housing has a bottom plate portion in a region in which the vibrator support portion is situated, a gap is formed between the vibrator support portion and the bottom plate portion of the housing. Thus, the vibration of the vibrator would not be hindered.

However, in the above case, because bend lines for forming the housing connection portion are out of line with bend lines for forming the vibrator support portion, manufacturing processes and time would be increased, thus resulting in an increase in costs. Further, in the above case, the height in the Z1-Z2 direction of the vibration generator would be increased by the height of the gap between the vibrator support portion and the bottom plate of the housing. Therefore, the size of the vibration generator would be increased.

Conversely, in the vibration generator according to the present embodiment, the bend lines for forming the housing connection portion 71 are in line with the bend lines for forming the vibrator support portion 72. Therefore, the vibration generator can be readily manufactured at low costs. Further, the height of the vibration generator can be decreased by the height of the above-described gap. Thus, the size of the vibration generator can be reduced.

(Variation)

Figure 15:
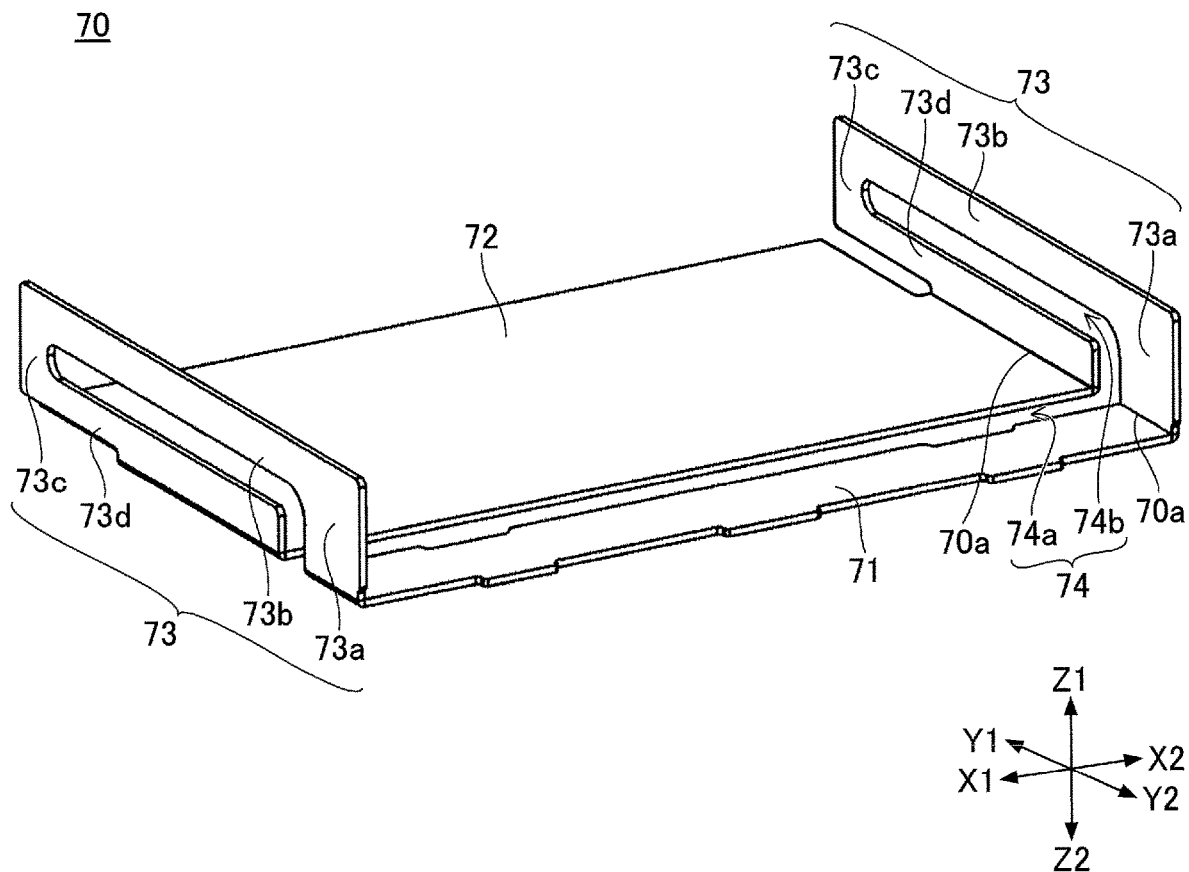
FIG. 15 is perspective view of an elastic member according to a variation of the vibration generator according to the first embodiment.

Next, a variation of the present embodiment will be described with reference to FIG. 15. As illustrated in FIG. 15, in a case where there is no need to provide either marks for alignment when the vibrator is attached to the vibrator support portion 72 or support portions for supporting the X1 side and the X2 side of the vibrator, the elastic member 70 is not required to include bent portions 75. If the elastic member 70 does not include bent portions 75, a bending process for forming bent portions 75 becomes unnecessary, thus allowing the elastic member 70 to be more readily manufactured at lower costs. Accordingly, the cost of the vibration generator can be further reduced.

Second Embodiment

Figure 16:
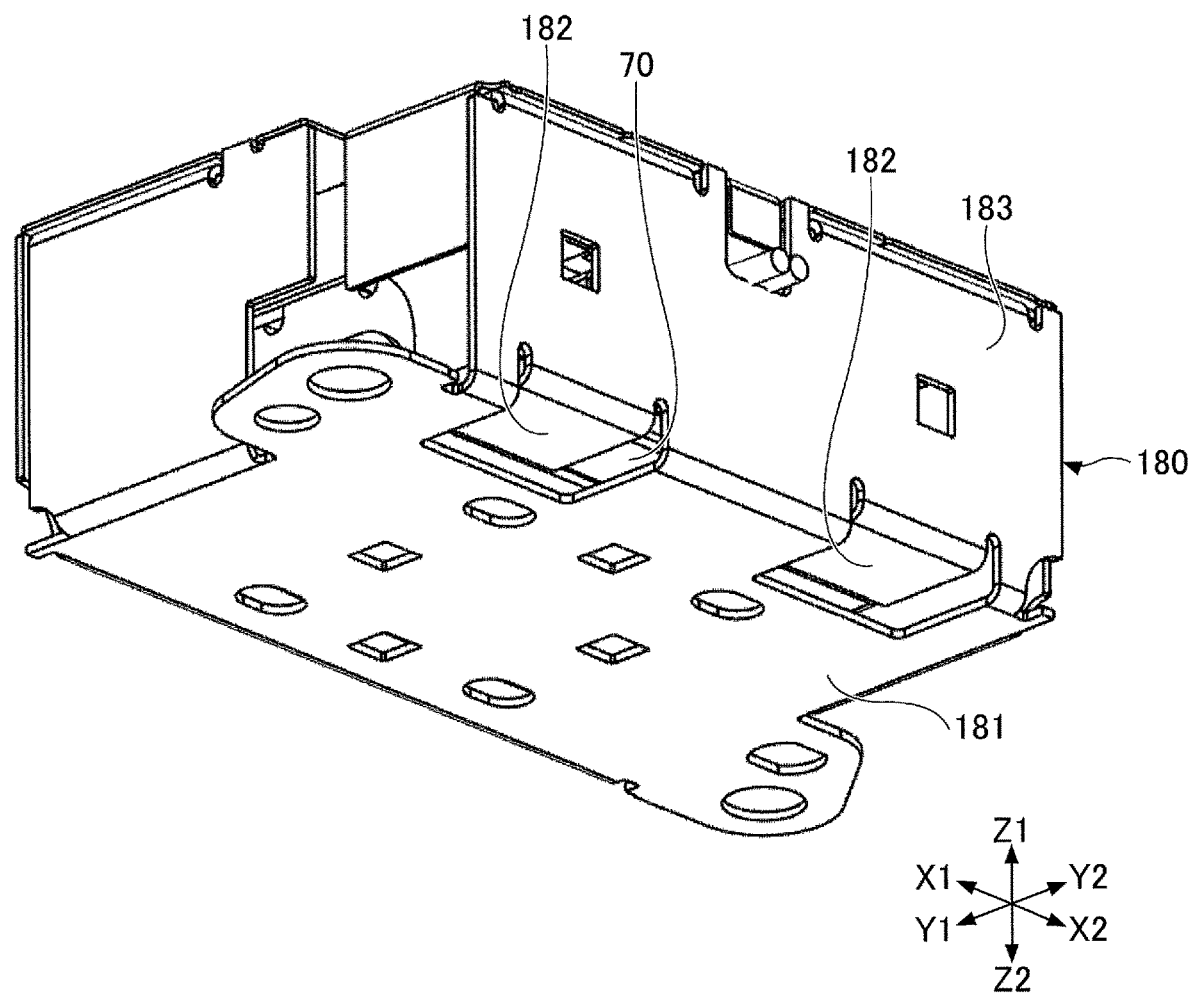
FIG. 16 is a perspective view of a vibration generator according to a second embodiment.
Figure 17:
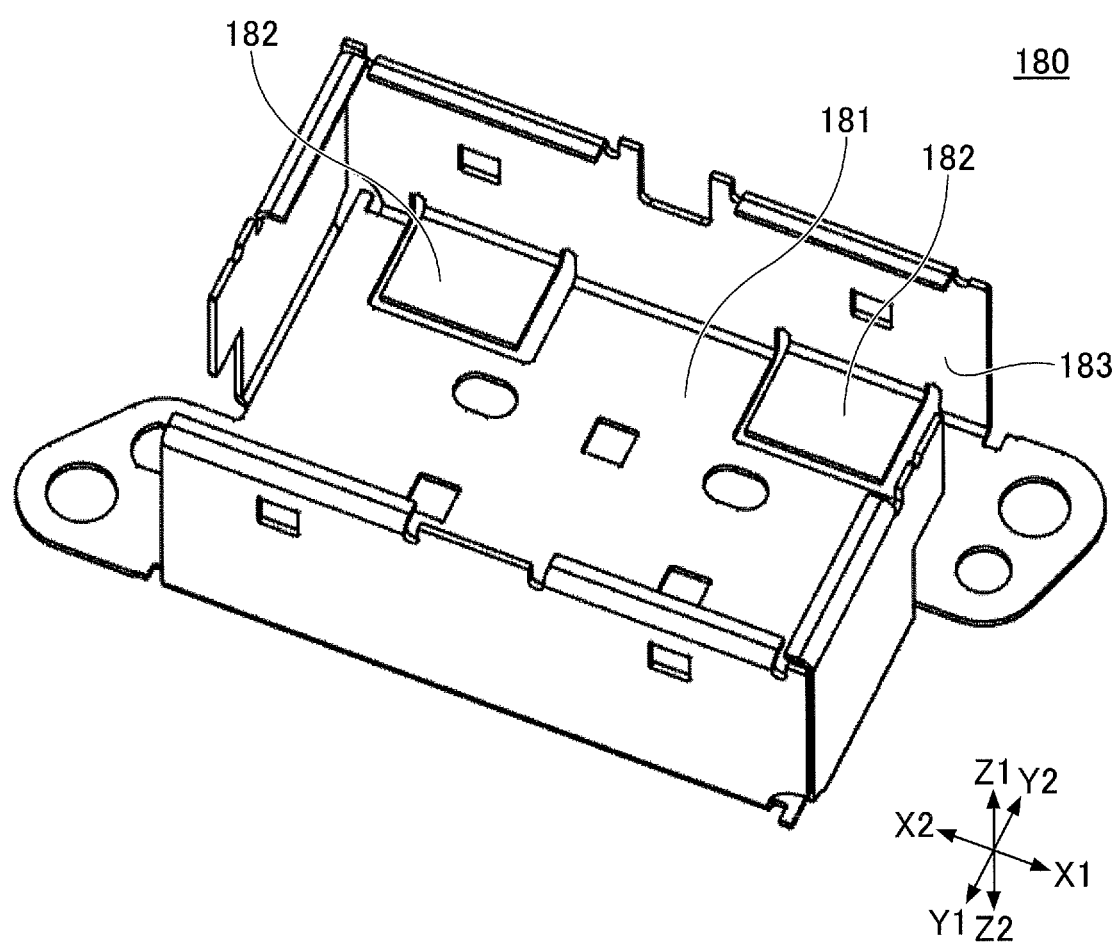
FIG. 17 is a perspective view of a housing of the vibration generator according to the second embodiment.
Figure 18:
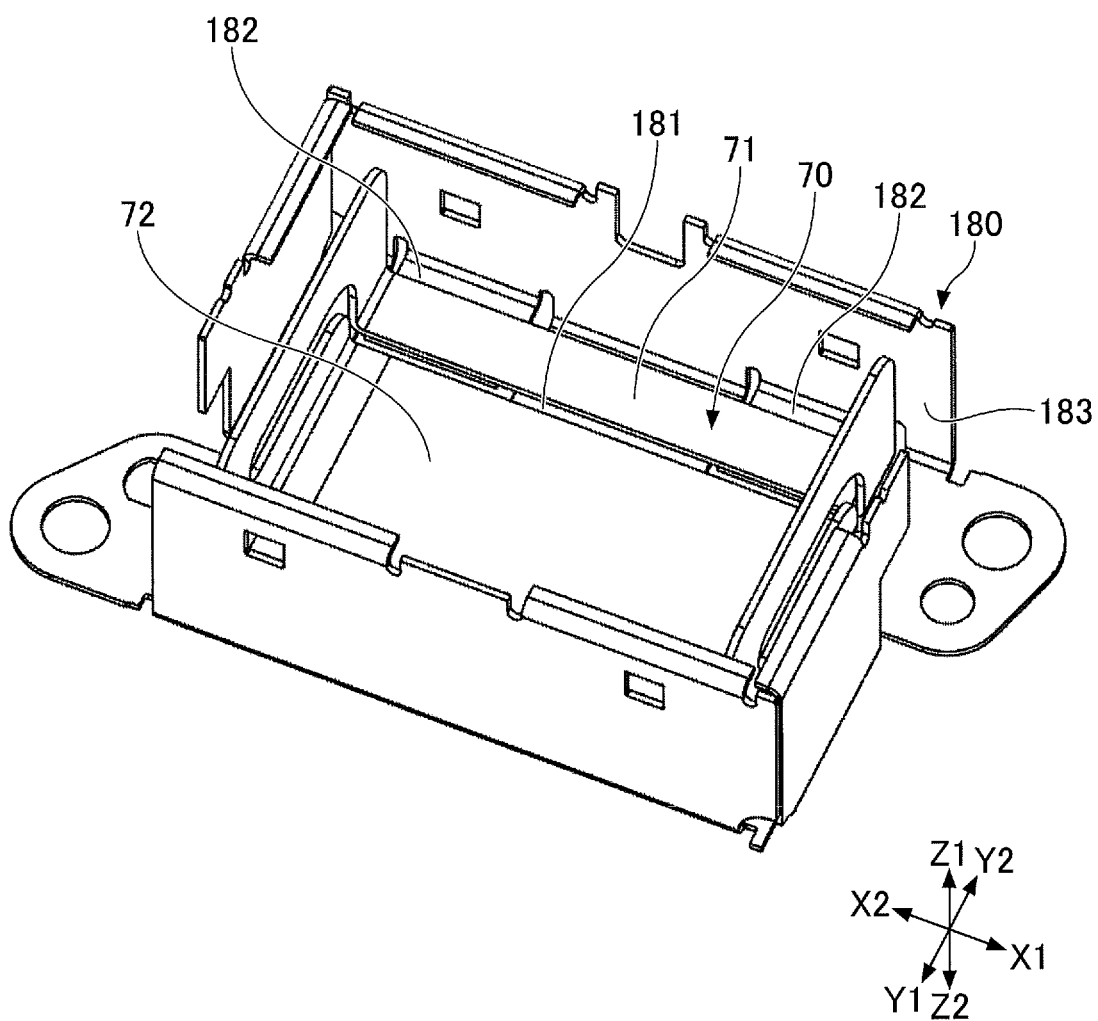
FIG. 18 is a diagram that depicts the vibration generator according to the second embodiment.
Figure 19:
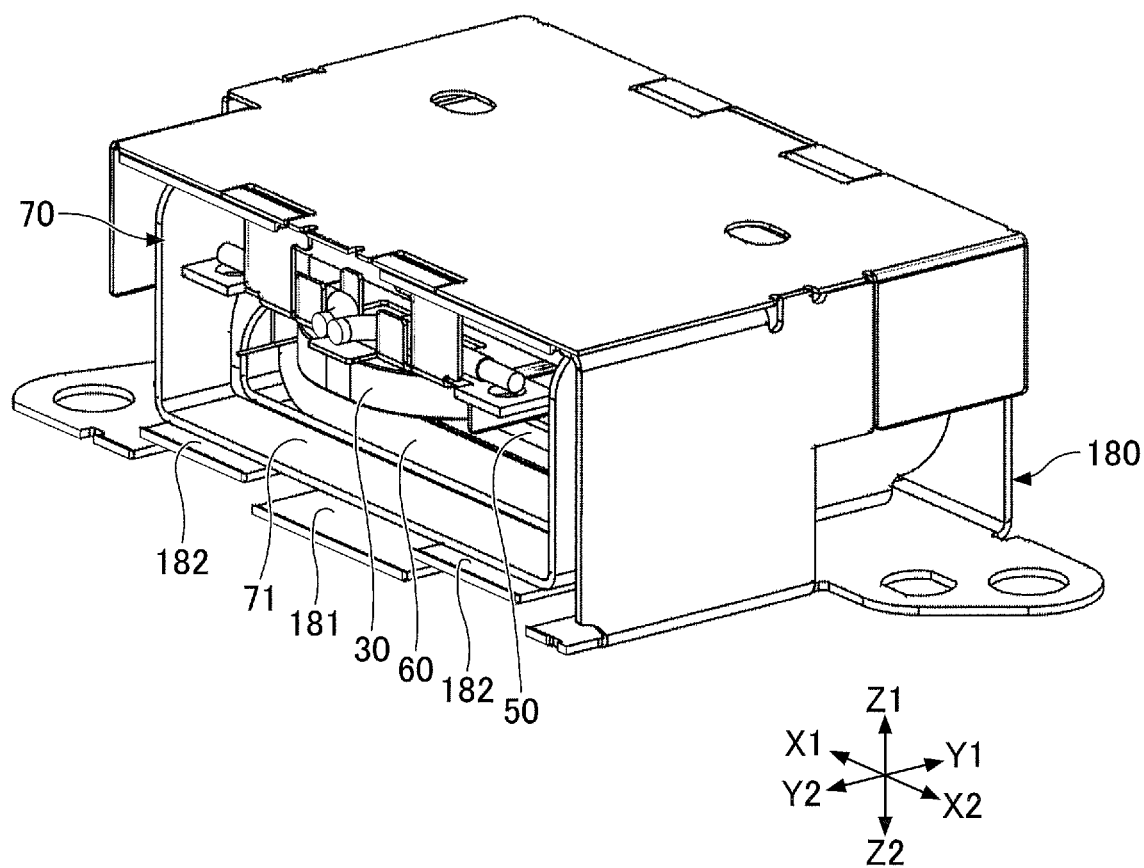
FIG. 19 is a perspective, cross-sectional view of the vibration generator according to the second embodiment.

Next, a vibration generator according to a second embodiment will be described with reference to FIG. 16 through FIG. 19. FIG. 16 is a perspective view of the vibration generator, viewed from the bottom side, according to the second embodiment. FIG. 17 is a perspective view of a housing 180 of the vibration generator according to the second embodiment. FIG. 18 is a perspective view of the housing 180 to which the elastic member 70 is attached. FIG. 19 is a perspective, cross-sectional view of the vibration generator according to the second embodiment.

The vibration generator according to the present embodiment differs from that of the first embodiment, in that the housing 180 does not have a large opening through the Z1-Z2 direction. Specifically, the housing 180 has an approximately rectangular parallelepiped shape, and includes a bottom surface 181 and bottom surface support portions 182, which are provided on the Z2 side and parallel to the XY-plane, and also includes four side surfaces parallel to the YZ-plane or the ZX-plane. In the present application, a casing formed by the housing 180 or by the cover 10 and the housing 180 may be referred to as a case.

The bottom surface support portions 182 are tongues that are bent from a side surface 183 so as to be parallel to the XY-plane. The side surface 183, of the side surfaces of the housing 180, is situated on the Y2 side and extends in the Z1 direction (toward the upper side) from the bottom surface 181. Accordingly, the bottom surface 181 and the bottom surface support portions 182 are in parallel.

Similar to the bottom plate portion 82 according to the first embodiment, the housing 180 includes the bottom surface support portions 182 on the Y2 side such that the housing connection portion 71 of the elastic member 70 is connected and fixed to the bottom surface support portions 182.

Accordingly, the surface on the Z2 side of the housing connection portion 71 of the elastic member 70 is connected and fixed to the surfaces on the Z1 side of the bottom surface support portions 182 of the housing 180.

The bottom surface support portions 182 are provided on the Z1 side by 1 mm to 2 mm relative to the bottom surface 181. The bottom surface support portions 182 are connected to the housing connection portion 71 of the elastic member 70 so as to support the elastic member 70. The bottom surface 181 covers the approximately entire vibrator support portion 72 of the elastic member 70. By providing the housing 180 with the bottom surface 181 that covers the entire vibrator support portion 72 of the elastic member 70, it is possible to prevent the vibrator support portion 72 of the elastic member 70 from contacting other external members. Further, the strength of the housing 180 can be increased by providing the housing 180 with the bottom surface 181.

As described above, in the present embodiment, the bottom surface support portions 182 of the housing 180 is provided below the vibrator support portion 72 of the elastic member 70, and the bottom surface 181 is provided below the bottom surface support portions 182. That is, on the Z2 side of the housing 180, the bottom surface 181 is provided below the vibrator support portion 72 of the elastic member 70, and the bottom surface 181 is provided below the bottom surface support portions 182.

Accordingly, a gap is formed between the bottom surface 181 of the housing 180 and the vibrator support portion 72 of the elastic member 70. Therefore, when the vibrator support portion 72 of the elastic member 70 is vibrated, the bottom surface 181 of the housing 180 does not contact and rub against the vibrator support portion 72, and thus, the housing 180 does not hinder the vibration of the vibrator support portion 72.

In the present embodiment, the housing connection portion 71 of the elastic member 70 is attached to the upper surfaces of the bottom surface support portions 182 of the housing 180. However, the housing connection portion 71 of the elastic member 70 may be attached to the lower surfaces of the bottom surface support portions 182 of the housing 180, as long as a gap is formed between the vibrator support portion 72 of the elastic member 70 and the bottom surface 181 of the housing 180.

Although the embodiments have been specifically described above, the present invention is not limited to the specific embodiments and various modifications and variations may be made without departing from the scope of the present invention.

What is claimed is:

1. A vibration generator comprising:
a housing;
a vibrator;
an elastic member that connects the housing and the vibrator; and
a driving means that causes the vibrator to vibrate,
characterized in that the elastic member includes a housing connection portion that is connected to the housing, a vibrator support portion that supports the vibrator, and a spring portion that connects the housing connection portion and the vibrator support portion, and
the spring portion is formed so as to be approximately perpendicular to the housing connection portion and the vibrator support portion,
wherein the vibrator vibrates in an X1-X2 direction, and
wherein the spring portion includes,
a first region extending from the housing connection portion in a Z1-Z2 direction perpendicular to the X1-X2 direction and a plane of the housing connection portion,
a second region extending from the first region in a Y1-Y2 direction perpendicular to the Z1-Z2 direction and the X1-X2 direction,
a third region extending from the second region in the Z1-Z2 direction, and
a fourth region extending from the third region in the Y2 direction opposite to the Y1 direction and connecting the third region to the vibrator support portion.

2. The vibration generator according to claim 1, wherein the driving means includes a magnet and a coil, the magnet being included in the vibrator and the coil being fixed to the housing,
the vibrator includes the magnet, an upper yoke, and a lower yoke, the upper yoke being provided above the magnet and the lower yoke being provided below the magnet and
the coil is provided between the upper yoke and the magnet.

3. The vibration generator according to claim 1, wherein the first region and the fourth region are arranged so as to have a gap between the first region and the fourth region.

4. The vibration generator according to claim 1, wherein the housing includes a bottom surface and a bottom surface support portion, the bottom surface being located below the elastic member and the bottom surface support portion being located above the bottom surface,
the housing connection portion of the elastic member is attached to the bottom surface support portion of the housing, and
a gap is formed between the vibrator support portion of the elastic member and the bottom surface of the housing.

5. The vibration generator according to claim 4, wherein the housing includes a side surface that is connected to the bottom surface and extends upward from the bottom surface, and
the bottom surface support portion is a tongue that is bent from the side surface so as to be parallel to the bottom surface.

6. The vibration generator according to claim 1, wherein the elastic member is formed by bending a metal plate, and
the spring portion includes an elastic region that extends in parallel to a bend line along which the spring portion is bent.

7. The vibration generator according to claim 6, further comprising a groove, the groove being provided in the metal plate that forms the elastic member,
wherein the housing connection portion and the vibrator support portion are separated by the groove.

8. The vibration generator according to claim 6, further comprising a bent portion formed by bending the metal plate, the bent portion being formed on the vibrator support portion so as to support the vibrator in a vibration direction or to align the vibrator when the vibrator is attached to the vibrator support portion.

* * * * *